May 1, 1928.

S. J. MAGUIRE 1,667,896

DUST SEALING DEVICE

Filed Dec. 30, 1926

INVENTOR
SAMUEL.J.MAGUIRE
BY Fetherstonhaugh & Co
ATTORNEYS

May 1, 1928. 1,667,896
S. J. MAGUIRE
DUST SEALING DEVICE
Filed Dec. 30, 1926 2 Sheets-Sheet 2

INVENTOR
SAMUEL J. MAGUIRE
BY Fetherstonhaugh & Co.
ATTORNEYS

Patented May 1, 1928.

1,667,896

UNITED STATES PATENT OFFICE.

SAMUEL J. MAGUIRE, OF MONTREAL, QUEBEC, CANADA.

DUST-SEALING DEVICE.

Application filed December 30, 1926. Serial No. 158,038.

This invention relates to new and useful improvements in dust sealing devices for grain weighing machines and the like. The object of the invention is to provide a simple and efficient means which will prevent dust laden air discharged from the weighing hopper from passing between the fixed and movable portions of the hopper and its feeding mechanism, or between the fixed and movable portions of the ventilators.

Another object is to provide a device which may be easily attached to the said fixed and movable sections and which will not affect the weighing of the grain while in operation.

Up to the present time it has been difficult to seal the space between the weighing hopper and the garner to prevent passing therebetween of dust laden air which has been displaced by the filling of the weighing hopper with grain. It has also been a difficult problem to provide a suitable sealing means between the fixed and movable sections of the hopper ventilators to prevent the dust laden air discharged from the inside of the weighing hopper from escaping and affecting the efficient working of the machinery, by allowing dust to settle on the upper surfaces of the weighing hopper and thereby affecting the weighing of the grain.

In my invention I overcome the above difficulties by providing a flexible sealing means which will allow free movement of the weighing sections with respect to the fixed sections of the machinery without affecting the weighing of the material in the scale hopper. The flexible sealing members are operated by the pressure of air from the weighing hopper, said air being displaced by feeding into the hopper the grain to be weighed.

In the drawings which illustrate one form of my invention,

Figure 5:
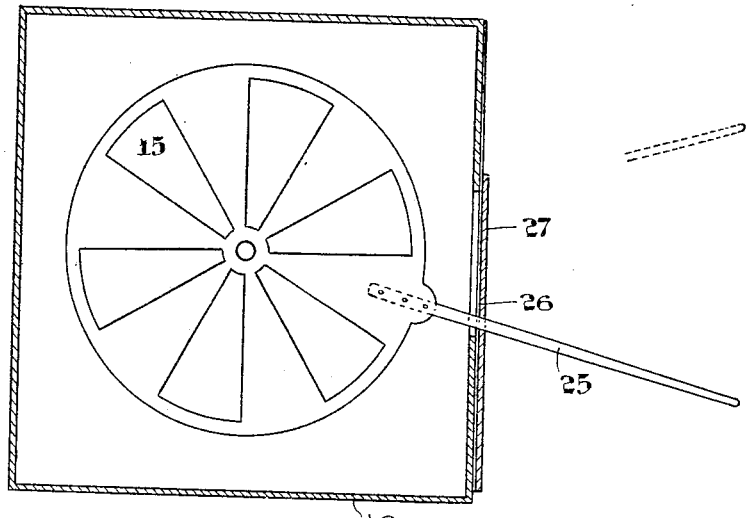
Figure 5 is a sectional plan taken on the line 5—5 Figure 2.
Figures 4, 6:
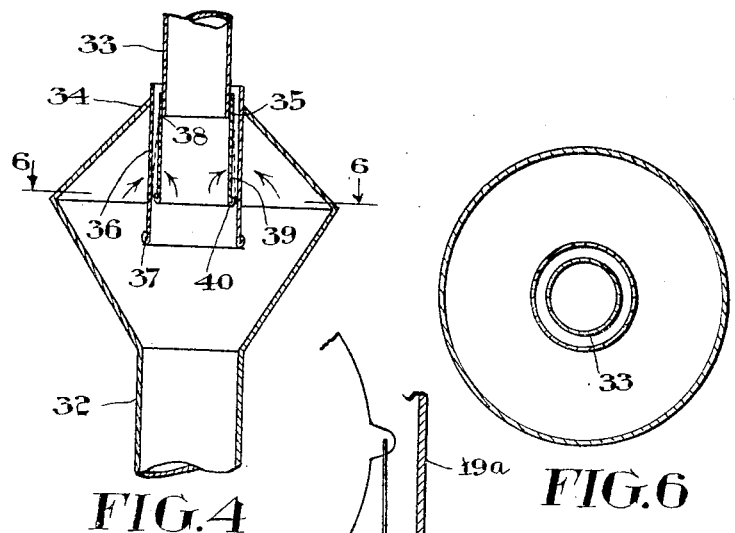
Figure 4 is a sectional side elevation showing my device applied to a ventilator.
Figure 6 is a sectional plan taken on the line 6—6 Figure 4.
Figure 7:
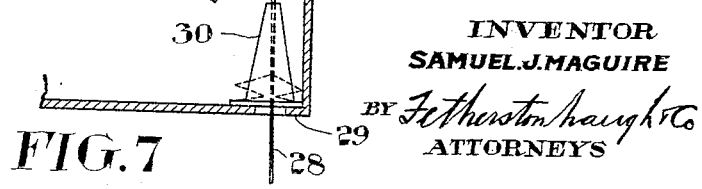
Figure 7 is a plan view of a modified type of valve operating means.

Referring more particularly to the drawings, 11 designates a garner or storage bin which may be secured to the fixed frame 12, by any suitable means not shown. The lower end 13 of the garner or storage bin converges towards the discharge end 14 within which is mounted the shutter valve 15 shown in plan in Figure 5. Secured to the converging sides of the garner are the angle members 16. Positioned directly below the opening is the scale hopper 17, the upper end of which converges towards the garner, but is spaced therefrom. There is a slight vertical movement between the weighing hopper and the garner and the main object of this invention is to provide means which will prevent dust laden air from being forced out of the scale hopper into the surrounding space when grain is fed into the scale hopper through the valve. Depending from the angle 16 and secured thereto by means of the bolts 18, is the pliable or flexible sealing member 19, which entirely surrounds the open end of the garner and passes into the open mouth 20 of the scale hopper, but clear of the upper edge 21. The lower edge 24ª of the member 19 is provided with a weight 22 which holds the side of the flexible member 19 in a substantially vertical plane. This weight may consist of flat steel bars. Depending from and secured to the upper edge 21 of the scale hopper, is the sealing member 23, which is also made of flexible material such as canvas, weighted at its lower edge 24, and spaced from the lower edge of the member 19, so that on maximum downward movement of the scale hopper, the lower edge 24 will lie above the bottom of the curtain 19. The sealing strips are spaced from one another so that there is no friction between them which would interfere with the weighing of the grain. The valve operating rod 25 extends through a slot 26 formed in the curtain member 19 and secured to said lever by any suitable means is the slot covering bar 27, when the valve operating mechanism shown in Figure 5 is used. This bar is made approximately twice the length of the slot, so that it covers same at all times during the operation of the valve. When the valve rod is of the push type shown in Figure 7, the valve rod 28 passes through a slot 29, and to prevent dust laden air from passing through said slot, a flexible cone-shaped guard 30 may be used with the smaller end secured to the valve rod and larger end secured to the sealing member 19ª clear of the slot 29. It will be seen that the guard 30 collapses into the space shown in dotted lines in Figure 7, when the valve is in the open position. The hopper is provided with one or more ventilators which carry the dust laden air clear of the weighing room, and a detail of one of said ventilators is shown in Figures 4 and 6. The exact position of the ventilator is not shown, but it will be readily understood that it may be attached to the outside of the scale hopper plate 31. Each ventilator consists of a lower pipe 32, and an upper pipe 33. The lower pipe communicates with the interior of the hopper and diverges outwardly and then inwardly towards its upper edge 34 which is spaced from the outer wall of the pipe 33, the lower edge 35 of which projects into the lower pipe 32, a short distance as shown in Figure 4. Depending from the upper edge 34 of the pipe 32, is the flexible sealing member or curtain 36, the lower edge of which is provided with a weight 37 to hold it in a substantially vertical position. Depending from the lower edge 38 of the pipe 33, is the flexible sealing curtain 39, the lower edge of which is provided with a weighted ring 40. The member 39 is spaced from the member 36 and its lower edge 40 is positioned above the edge 37 so that when any vertical movement occurs between the ventilator sealing curtains, said curtains will contact with one another at all times when air is forced through the pipes. The pipe 33 may extend upwardly through the roof of the weighing house so that the dust laden air is conveyed to the outside atmosphere.

Many modifications may be made in the device without departing from the spirit of the invention.

Figure 1:
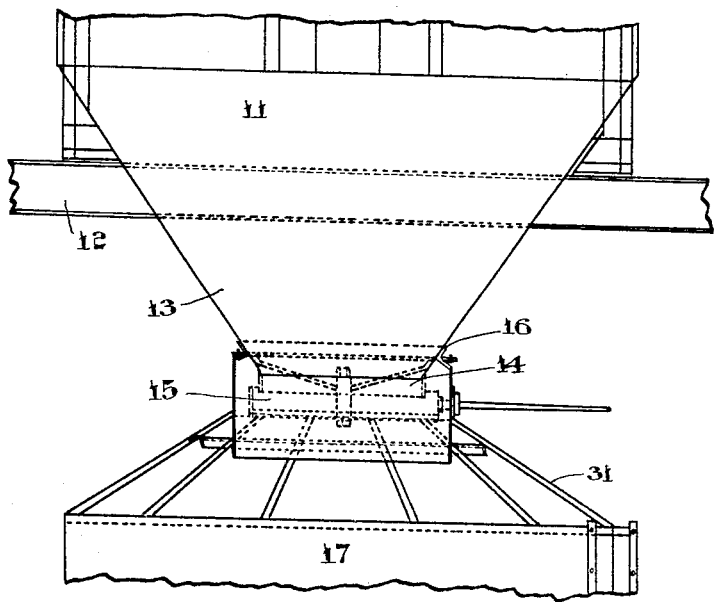
Figure 1 is a part side elevation showing the junction between the feeding mechanism and the grain weighing hopper.
Figure 2:
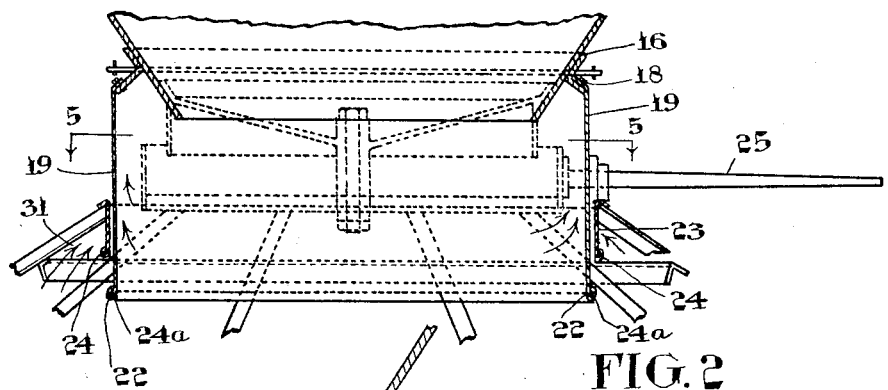
Figure 2 is an enlarged sectional side elevation of the sealing means between the grain feeding device and the grain weighing hopper.
Figure 3:
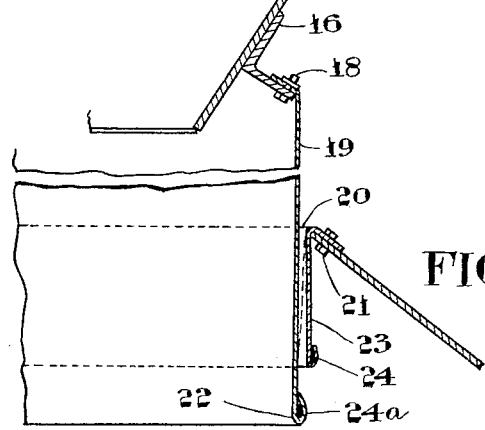
Figure 3 is a part sectional side elevation showing the manner of attaching the sealing devices to the hopper and to the garner.

The operation of the mechanism is as follows. Grain is fed into the weighing hopper by opening the valve at the bottom of the garner or storage bin. The sudden inrush of grain into the scale hopper causes a sudden outrush or expulsion of the air displaced by the grain. The only outlet for the air is through the ventilators. The dust laden air takes the path indicated by arrows in Figure 2, and forces the adjacent faces of the sealing curtains together, as shown in dotted lines in Figure 2 and also in Figure 4. The sealing members coming together seal the outlet and prevent the dust laden air from passing into the weighing house so that its only course is up through the ventilators. As soon as the pressure of air has exhausted itself, the sealing members are pulled by the weights clear of one another, so that there is no friction between them which would interfere with the weighing of the grain.

The device is very simple in operation and provides an efficient seal which will not interfere with the free working of the scale hopper. The sealing members are very easily secured in position and absolutely prevent dust from the interior of the scale hopper from escaping and collecting on the upper plates thereof, a condition which has heretofore interfered with the proper working of the scale. While the sealing mechanism has been shown as applied to a weighing scale for grain, it will be obvious that many other uses and applications of the invention may be made.

Having thus described my invention, what I claim is:—

1. A sealing device between fixed and movable guiding means which communicate with one another, comprising a flexible curtain surrounding an opening in the fixed guiding means, a flexible curtain surrounding the opening into the movable guiding means, one of said curtains being adapted to surround the other and contact with same when pressure is applied to the curtain walls.

2. A sealing device between fixed and movable members which communicates with one another comprising a flexible curtain surrounding an opening in the fixed member and depending therefrom, a flexible curtain surrounding the opening in the movable member, one of said curtains being adapted to surround the other and to contact with same when air pressure is applied to the walls of the curtain members.

3. A sealing device between fixed and movable guiding means which communicate with one another through adjacent openings, comprising a flexible curtain suspended from and enclosing the opening in the fixed member, a flexible curtain suspended from and surrounding the opening in the movable member, one of said curtains being made to surround the other curtain but spaced therefrom, means secured to the curtains to hold them in a vertical plane, one of said curtains being made of greater depth than the other curtain.

4. In a sealing device between a garner and a weighing hopper communicating through openings in their adjacent ends, a flexible curtain member suspended from and surrounding the opening in the garner, a flexible curtain member secured to the edge of the opening in the weighing hopper and depending thereinto, said weighing hopper curtain being adapted to surround the garner curtain and to be spaced therefrom, one curtain being made of greater depth than the other curtain so that they will contact with one another at all times during relative movement of the hopper when air pressure is applied to the curtain walls.

5. In a sealing device between a valve controlled garner and a weighing hopper, which communicate with one another through adjacent openings, a flexible curtain member depending from the garner and surrounding the opening therein, said curtain having an aperture formed therein, a valve operating lever freely mounted in said aperture, means secured to the lever to seal the aperture, a flexible curtain member secured to the edge of the opening in the weighing hopper and projecting thereinto, said weighing hopper curtain being adapted to surround the garner curtain, and so formed that it will contact with the walls of the garner curtain during relative movement of the hopper when air under pressure is applied to the curtain walls.

In witness whereof, I have hereunto set my hand.

SAMUEL J. MAGUIRE.